United States Patent [19]

Leclercq

[11] 4,158,048

[45] Jun. 12, 1979

[54] PROCESSES FOR CONVERSION OF SULFUROUS ANHYDRIDE TO SULFURIC ANHYDRIDE AND VICE VERSA WITH A Fe, Cu, ALKALI METAL CONTAINING CATALYST

[75] Inventor: Phillippe Leclercq, Lille, France

[73] Assignee: Produits Chimiques Ugine Kuhlmann, Paris, France

[21] Appl. No.: 862,730

[22] Filed: Dec. 21, 1977

Related U.S. Application Data

[62] Division of Ser. No. 763,224, Jan. 27, 1977, Pat. No. 4,127,509.

[30] Foreign Application Priority Data

Mar. 11, 1976 [FR] France .................................. 76 06974

[51] Int. Cl.$^2$ ............................................. C01B 17/68
[52] U.S. Cl. ...................................... 423/533; 423/534
[58] Field of Search ............... 423/522, 532, 533, 534, 423/535, 536, 538

[56] References Cited

U.S. PATENT DOCUMENTS

| 716,985 | 12/1902 | Clemm | 423/538 |
|---|---|---|---|
| 1,018,402 | 2/1912 | Albert | 423/522 |
| 1,741,310 | 12/1929 | Jaeger | 423/539 |
| 1,852,207 | 4/1932 | Holmes | 423/535 |
| 2,029,530 | 2/1936 | Jaeger | 423/535 |
| 2,037,028 | 4/1936 | Jaeger | 423/535 |
| 3,318,662 | 5/1967 | Pauling | 423/522 |
| 3,987,153 | 10/1976 | Stiles | 423/522 |

FOREIGN PATENT DOCUMENTS

| 1442648 | 3/1969 | Fed. Rep. of Germany | 423/542 |
|---|---|---|---|
| 256 of | 1878 | United Kingdom | 423/538 |
| 17266 of | 1898 | United Kingdom | 423/533 |
| 4610 of | 1901 | United Kingdom | 423/533 |
| 11792 of | 1901 | United Kingdom | 423/533 |
| 14976 of | 1901 | United Kingdom | 423/538 |

*Primary Examiner*—O. R. Vertiz
*Assistant Examiner*—Gary P. Straub
*Attorney, Agent, or Firm*—Brooks, Haidt, Haffner & Delahunty

[57] ABSTRACT

Novel processes for converting sulfurous anhydride to sulfuric anhydride and vice versa, which processes are carried out in the gaseous phase with a catalyst comprising iron, copper, and at least one alkali metal selected from among sodium and potassium, the catalyst simultaneously having good activity at 600° C. and withstanding temperatures up to 850° C. without degradation.

5 Claims, No Drawings

PROCESSES FOR CONVERSION OF SULFUROUS ANHYDRIDE TO SULFURIC ANHYDRIDE AND VICE VERSA WITH A Fe, Cu, ALKALI METAL CONTAINING CATALYST

This is a divisional of application Ser. No. 763,224, filed on Jan. 27, 1977 now U.S. Pat. No. 4,127,509.

BACKGROUND OF THE INVENTION

The present invention relates to a novel catalyst for the conversion of sulfurous anhydride to sulfuric anhydride, and more particularly, it provides a novel catalyst comprising iron, copper, and at least one alkali metal chosen from the group of sodium and potassium, the catalyst being capable of enduring severe thermal shock, as well as processes for producing and using the catalyst.

In the preparation of sulfuric acid by the contact process, the conversion of sulfur dioxide to sulfur trioxide is usually effected in a number of steps in the presence of a catalyst containing vanadium at a temperature of from 400° C. to 600° C. at a pressure equal to or below 15 bars.

Laws for the control of pollution ordain that the residual content of sulfur dioxide in the exhaust gases be less and less, and this requires that the conversion yields of $SO_2$ to $SO_3$ be very high, on the order of 0.007 to 0.998. Such efficiencies are actually obtained at atmospheric pressure with intermediate absorption of the $SO_3$ formed, but are more easily obtained with a pressure of 5 to 15 bars with or without intermediate absorption of the $SO_3$ produced.

The vanadium catalysts are extremely active, and so none but the smallest quantities are utilized. It follows that when the operation is carried out under pressure the temperature gradient of the catalyst bed is very high. The control of the thermal stability of the catalyst mass is for this reason very difficult. There is thus a very considerable risk of catalyst destruction if a temperature of about 620° C. is exceeded.

Accordingly, there is a considerable commercial need to devise a catalyst for the conversion of $SO_2$ to $SO_3$ which simultaneously has good activity at temperature on the order of 600° C. and will withstand the stress of temperatures up to 850° C. without degradation.

The inverse reaction for causing $SO_3$ to revert to $SO_2$, which occurs for instance in the recovery of residual acids and the conversion of available energy starting from solar or nuclear reactors, is very slow in the absence of a catalyst. There thus also exists a commercial requirement for the preparation of a catalyst capable of use at 600°–850° C. for causing the reversion of $SO_3$ to $SO_2$.

THE INVENTION

The present invention provides a catalyst which answers the need for a catalyst stable at elevated temperatures and which can be also used for the reversion of $SO_3$ to $SO_2$. Briefly, the catalyst of the present invention contains iron, copper, and at least one alkali metal which is sodium or potassium. The support for the catalyst can be a siliceous support such as silica of the tridymite type.

It is generally desirable according to the present invention that the atomic ratio of copper to iron be from about 0.1 to 0.55, and in certain embodiments of this invention the preferred ratio is about 0.35. In general, the atomic ratio of the alkali metal to iron is desirably from about 1.3 to about 3.2 in the practice of the invention, and in certain preferred embodiments it is about two.

The preparation of the catalyst is carried out according to certain embodiments in the following steps:

(a) Mixing of the compounds of iron, copper, and the alkali metal (s);

(b) Addition of a siliceous support;

(c) Mixing of the iron, copper, and alkali metal compounds for about 30 minutes with a sufficient quantity of water so the resulting mixture is a homogeneous paste. The weight amount of water is desirably from about 25 to 35 percent, and is preferably about 30 percent;

(d) Shaping the paste in an appropriate apparatus, for example, an extruder, so as to obtain cylindrical catalyst grains preferably having a diameter of about 6 mm and a length of about 6 to 8 mm;

(e) Drying in an appropriate apparatus, for instance in an oven or a drying tunnel swept with an air current at 100°–110° C.; and (f) Saturation heat treatment by heating the dried ingredients at a temperature of from 550° to 750° C. for six to eight hours while they are swept with an air current having a sulfur dioxide content of from about 4 to about 10 percent. In certain preferred embodiments, a temperature of from 600° to 620° C. is used for the heat treatment.

Following the heat treatment, the quantity of iron oxide present, expressed as $Fe_2O_3$, is desirably from about 7 to 15 percent, and in certain preferred embodiments it is from about 10 to 12 percent.

The extrusion taught in step (d) of the process is only one instance of preparation of the physical form of the novel catalyst. The catalyst can also be provided in numerous other physical forms compatible with the particular process and equipment in which it is to be used. Thus, in other embodiments of this invention, the catalyst is produced in forms, such as pellets and the like. When pellets are to be prepared, the drying of step (e) can precede forming step (d).

The compounds of iron and copper used as the starting materials can be chosen from a wide variety of inorganic and organic materials. Such compounds include the oxides, hydroxides, and hydrated and anhydrous salts having a volatile organic or inorganic anion. Desirable organic salts include salts of carboxylic acids, preferably lower alkyl carboxylic and dicarboxylic acid having from one to five carbon atoms such as formates, acetates, malates, and the like. The inorganic salts include anions such as sulfates and anions which are thermally less stable than sulfates, such as carbonates, nitrates, and the like.

The alkali metal for preparation of the catalyst can be compounds of sodium and/or potassium. Desirable compounds include carbonates, anhydrous hydroxides or aqueous lyes, sulfates, silicates, and the like.

The siliceous support used for the catalyst of the invention is desirably silica with a tridymite structure having characteristics such that it contributes to the catalytic and mechanical stability of the catalyst during usage at temperatures all the way up to 800°–850° C. It should be noted that siliceous supports change to a cristobalite structure when the temperature is unsuitable.

In certain preferred embodiments, the siliceous support has a mean particle size of about 75μ, an apparent density of about 0.8 g/m$^3$, a specific surface on the order of 50 m$^2$/g, and a porosity on the order of 0.8 – 0.85 cm$^3$/g. In certain embodiments, the amount of the support is from about 450 to 750 parts by weight for each 100 parts by weight of iron, and in preferred embodiments the quantity of support is about 500 parts for each 100 parts of iron.

The catalyst of the present invention, while having good activity for the conversion of SO$_2$ and SO$_3$ and the inverse reaction, in their respective temperature ranges, tolerates temperatures clear up to 850° C. Thus, the catalyst is most useful for interconverting SO$_2$ and SO$_3$, that is, for converting sulfur dioxide to sulfur trioxide and sulfur trioxide to sulfur dioxide.

The following examples are given to illustrate embodiments of the invention as it is presently preferred to practice it. It will be understood that these examples are illustrative, and the invention is not to be considered as restricted thereto except as indicated in the appended claims.

EXAMPLE I

A mixture is charged with 128.6 g of ferric sulfate Fe(SO$_4$)$_3$ and 56.2 g of copper sulfate in the form of CuSO$_4$.5H$_2$O, and 163.7 g of 40% aqueous soda lye is added. These materials are intimately admixed and then 180 g of silica in the tridymite form is added. The mixing is then continued for 30 minutes until a homogeneous paste is obtained.

The resulting paste is then passed through an extruder to obtain cylindrical catalyst articles having a diameter of 6 mm and a length of from 6 to 8 mm. The granules so obtained are then dried at 110° C. and are thereafter heat-treated by maintaining them at 650° C. for six hours under a current of air containing 10% SO$_2$.

The conversion ratio of SO$_2$ to SO$_3$ obtained with this catalyst by passing therethrough a gas containing 10% SO$_2$ and 11% O$_2$ (by volume) at a pressure of one bar and at the rate of 9000 L/hr/liter of catalyst (at normal temperature and pressure) is 7% at 560° C.; 15% at 620° C.; and 29% at 680° C.

EXAMPLE II

Following the procedure of Example I, a mixture of 100.0 g of Fe$_2$(SO$_4$)$_3$, 43.7 g CuSO$_4$.5H$_2$O, 80 g of 30% aqueous sodium hydroxide, and 65.3 g of 40% potassium hydroxide is prepared, and 140 g of tridymite silica is used as the support.

The mixing, extrusion, drying, and heat-treatment are carried out as in Example I. The rates of conversion of SO$_2$ to SO$_3$ obtained with this catalyst under the same operating conditions as in Example I are 5.3% at 560° C.; 14.1% at 620° C.; and 25.4% at 680° C.

EXAMPLE III

Example I is repeated utilizing a mixture of 17.55 g of copper oxide, CuO, and 139 g of iron sulfate in the form of FeSO$_4$.7H$_2$O to which is added 80.0 g of 50% aqueous soda lye and then 140 g of tridymite silica.

The mixing, extrusion, drying, and heat-treatment are carried out as in Example I.

The conversion rates of SO$_2$ to SO$_3$ obtained with the catalyst under the Example I operating conditions are 5.7% at 560° C.; 12.8% at 620° C.; and 22.5% at 680° C.

EXAMPLES IV AND V

The catalyst of Example I is subjected to accelerated ageing by long-duration heat-treatment carried out for 100 hours at 650° C. under an air current containing 4% of SO$_2$. After this treatment, the catalyst is found to have the following composition, in weight percent:

| | |
|---|---|
| Fe$_2$O$_3$ | 11.36% |
| CuO | 3.82 |
| Na$_2$O | 10.00 |
| SO$_3$ | 39.28 |
| SiO$_2$ | 35.54 |

Measurements of the SO$_2$ to SO$_3$ conversion rate are then made according to the process of Example I at pressures of one bar (Example IV) and 6.8 bars (Example V) with the following results:

| | Temperature | | |
|---|---|---|---|
| Example | 560° C. | 620° C. | 680° C. |
| IV | 5.5% | 13.5% | 26.3% |
| V | 22% | 37% | 34% |

EXAMPLE VI

Over the catalyst prepared according to Example I is passed a gas containing 50% SO$_3$ and 50% nitrogen at the rate of 4000 L (at normal temperature and pressure)/hr/liter of catalyst.

The conversion rates of SO$_3$ to SO$_2$ obtained at atmospheric pressure are 58% at 800° C.; 32% at 735° C.; and 21% at 680° C. Without the catalyst, the conversion of SO$_3$ to SO$_2$ under these same conditions is negligible.

What is claimed is:

1. A process for the interconversion of gaseous sulfur dioxide and sulfur trioxide, the process being carried out with sulfur dioxide and oxygen to produce sulfur trioxide or with sulfur trioxide to produce sulfur dioxide and oxygen, which process comprises passing the gaseous sulfur dioxide and oxygen or sulfur trioxide at a temperature of at least about 550° C. over a catalyst consisting essentially of iron, copper, and at least one alkali metal which is sodium or potassium and which is present in an atomic amount greater than the atomic amount of iron, the atomic ratio of copper to iron being from about 0.1 to 0.55 and the atomic ratio of alkali metal to iron being from 1.3 to 3.2.

2. A process according to claim 1 wherein the temperature is from about 550° to about 850° C.

3. A process according to claim 1 wherein the catalyst has a siliceous support.

4. A process according to claim 1 wherein the catalyst is pretreated by heating at about 550° to about 750° C. under a current of gas containing sulfur dioxide.

5. A process according to claim 4 wherein the catalyst to be pretreated is made into the form of a shaped paste and dried at 100° to 110° C. prior to the heat treatment.

* * * * *